US008229121B2

United States Patent
Ju et al.

(10) Patent No.: US 8,229,121 B2
(45) Date of Patent: Jul. 24, 2012

(54) METHOD OF TRACING DEVICE KEYS FOR BROADCAST ENCRYPTION

(75) Inventors: Hak-soo Ju, Suwon-si (KR); Choong-hoon Lee, Seoul (KR); Young-sun Yoon, Suwon-si (KR); Sun-nam Lee, Suwon-si (KR); Jin-mok Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 12/393,056

(22) Filed: Feb. 26, 2009

(65) Prior Publication Data

US 2009/0304185 A1   Dec. 10, 2009

(30) Foreign Application Priority Data

Jun. 9, 2008 (KR) .................. 10-2008-0053817

(51) Int. Cl.
*H04L 29/06* (2006.01)
(52) U.S. Cl. ........................ 380/277; 713/158; 707/3
(58) Field of Classification Search .................. 380/277; 707/3; 713/158
See application file for complete search history.

(56) References Cited

U.S. PATENT DOCUMENTS

| 7,010,125 B2* | 3/2006 | Lotspiech et al. | 380/242 |
| 7,970,141 B2* | 6/2011 | Boneh et al. | 380/277 |
| 2007/0121938 A1* | 5/2007 | Yoon | 380/44 |

FOREIGN PATENT DOCUMENTS

KR   10-0562982 B1   3/2006

OTHER PUBLICATIONS

Benny Chor, Amos Fiat, Moni Noar, and Benny Pinkas, Tracing Trators. 2000,IEEE.*
Benny Chor, Amos Fiat, Moni Naor, and Benny Pinkas , Tracing Trators 1994.*

* cited by examiner

*Primary Examiner* — Jung Kim
*Assistant Examiner* — Ghodrat Jamshidi
(74) *Attorney, Agent, or Firm* — Sughrue Mion, PLLC

(57) ABSTRACT

Provided are a method of tracing a device key in a user key management system using a hierarchical hash chain broadcast encryption scheme (HBES) algorithm, a user key management system for executing the method of tracing a device key, and a computer program for executing the method of tracing a device key. The method of tracing a device key of an illegal decoder in a user key management system for broadcast encryption includes: tracing a device key using a binary search; and revoking the traced device key. The technology according to the present invention can be applied to prevent exposure of the device keys to hacking. The present invention provides a method of tracing which can be applied to an HBES algorithm structure.

21 Claims, 15 Drawing Sheets

|   | 1 | 2 | 3 | 4 |
|---|---|---|---|---|
| 60 — | $S_1$ | K(1,2) | K(1,3) | K(1,4) |
| 70 — | K(2,4) | $S_2$ | K(2,2) | K(2,3) |
|   | K(3,3) | K(3,4) | $S_3$ | K(3,2) |
|   | K(4,2) | K(4,3) | K(4,4) | $S_4$ |

| 0 | 0 | 0 | 1 | 0 | 3 | 0 | 3 |
|---|---|---|---|---|---|---|---|
| 0 | 2 | 1 | 1 | 0 | 1 | 0 | 1 |
| 0 | 1 | 1 | 1 | 0 | 2 | 0 | 2 |
| 3 | 0 | 0 | 0 | 1 | 1 | 1 | 2 |

METHOD OF TRACING DEVICE KEYS FOR BROADCAST ENCRYPTION

CROSS-REFERENCE TO RELATED PATENT APPLICATION

This application claims the benefit of Korean Patent Application No. 10-2008-0053817, filed on Jun. 9, 2008, in the Korean Intellectual Property Office, the disclosure of which is incorporated herein in its entirety by reference.

BACKGROUND OF THE INVENTION

1. Field of the Invention

Methods consistent with the present invention relate to broadcast encryption, and more particularly, to a method of tracing a device key in a user key management system for broadcast encryption.

2. Description of the Related Art

Broadcast encryption is an efficient method for a transmitter, that is, a broadcast center, to transmit information to desired users from among all the users, and can be used efficiently when a group of users who will receive information is arbitrary and is dynamically changed. The most important characteristic of the broadcast encryption is to revoke a device key of an undesired user, for example, an illegal user, i.e., an unauthorized user, or an expired user, that is, to remove the device key from a broadcast encryption system.

A hierarchical hash chain broadcast encryption scheme (HBES) algorithm is one of the broadcast encryption methods. Also, it is inefficient in that a conventional method of tracing a device key is applied to the HBES algorithm and thus an efficient method of tracing a compromised device key is required.

Conventionally, only a broadcast encryption (revocation) algorithm using a one-way hash chain exists. Thus, when a key set is exposed or when illegal devices, i.e., unauthorized, are distributed due to cloning, there is no tracing method afterward.

SUMMARY OF THE INVENTION

Exemplary embodiments of the present invention provide a method of tracing a device key in a user key management system using a hierarchical hash chain broadcast encryption scheme (HBES) algorithm.

The present invention also provides a user key management system for executing the method of tracing a device key.

The present invention also provides a computer readable recording medium having embodied thereon a computer program for executing the method of tracing a device key.

According to an aspect of the present invention, there is provided a method of tracing a device key of an illegal decoder in a user key management system for broadcast encryption, the method including: tracing a device key using a binary search; and revoking the traced device key.

Tracing a device key using a binary search may include: inputting an interval [a,b] of device numbers, wherein the first device number is a and the last device number is b; determining whether a is b−1; if a is b−1, generating a test cipher text using a so as to determine whether the illegal decoder can reproduce the test cipher text and as a result, selecting one of a and b; and if a is not b−1, calculating c, which is an intermediate value of a and b, generating a test cipher text using c so as to determine whether the illegal decoder can reproduce the test cipher text, and as a result, selecting one of the interval [a,c] and the interval [c,b], inputting the selected interval, and tracing the device key again.

c may be the largest value from among the integer numbers that are smaller than or the same with (a+b)/2, if (a+b)/2 is not an integer number.

The user key management system may use a device key allocation structure using a hash chain.

In the user key management system, a hierarchical hash chain broadcast encryption scheme (HBES) algorithm may be used.

According to another embodiment of the present invention, there is provided a user key management system for broadcast encryption, the system including: a device key tracing unit tracing a device key of an illegal decoder using a binary search; and a device key revoking unit revoking the traced device key.

The device key tracing unit may include: an interval input unit inputting an interval [a,b] of device numbers, wherein the first device number is a and the last device number is b; a determining unit determining whether a is b−1; a device number selecting unit, if a is b−1, generating a test cipher text using a so as to determine whether the illegal decoder can reproduce the test cipher text and as a result, selecting one of a and b; and an interval repetition unit, if a is not b−1, calculating c, which is an intermediate value of a and b, generating a test cipher text using c so as to determine whether the illegal decoder can reproduce the test cipher text, and as a result, selecting one of the interval [a,c] and the interval [c,b], outputting the selected interval to the interval input unit, inputting the interval selected by the interval input unit, the determining unit, and the device number selecting unit, and tracing the device key again.

The interval repetition unit may determine c as the largest value from among the integer numbers that are smaller than or the same with (a+b)/2, if (a+b)/2 is not an integer number.

The system may uses a device key allocation structure using a hash chain. In the system, a hierarchical hash chain broadcast encryption scheme (HBES) algorithm may be used.

BRIEF DESCRIPTION OF THE DRAWINGS

The above and other features and aspects of the present invention will become more apparent by describing in detail exemplary embodiments thereof with reference to the attached drawings in which:

FIGS. 7 and 8 illustrate a Marlin HBES algorithm;

DETAILED DESCRIPTION OF THE INVENTION

Hereinafter, the present invention will be described more fully with reference to the accompanying drawings, in which exemplary embodiments of the invention are shown.

Figure 1:
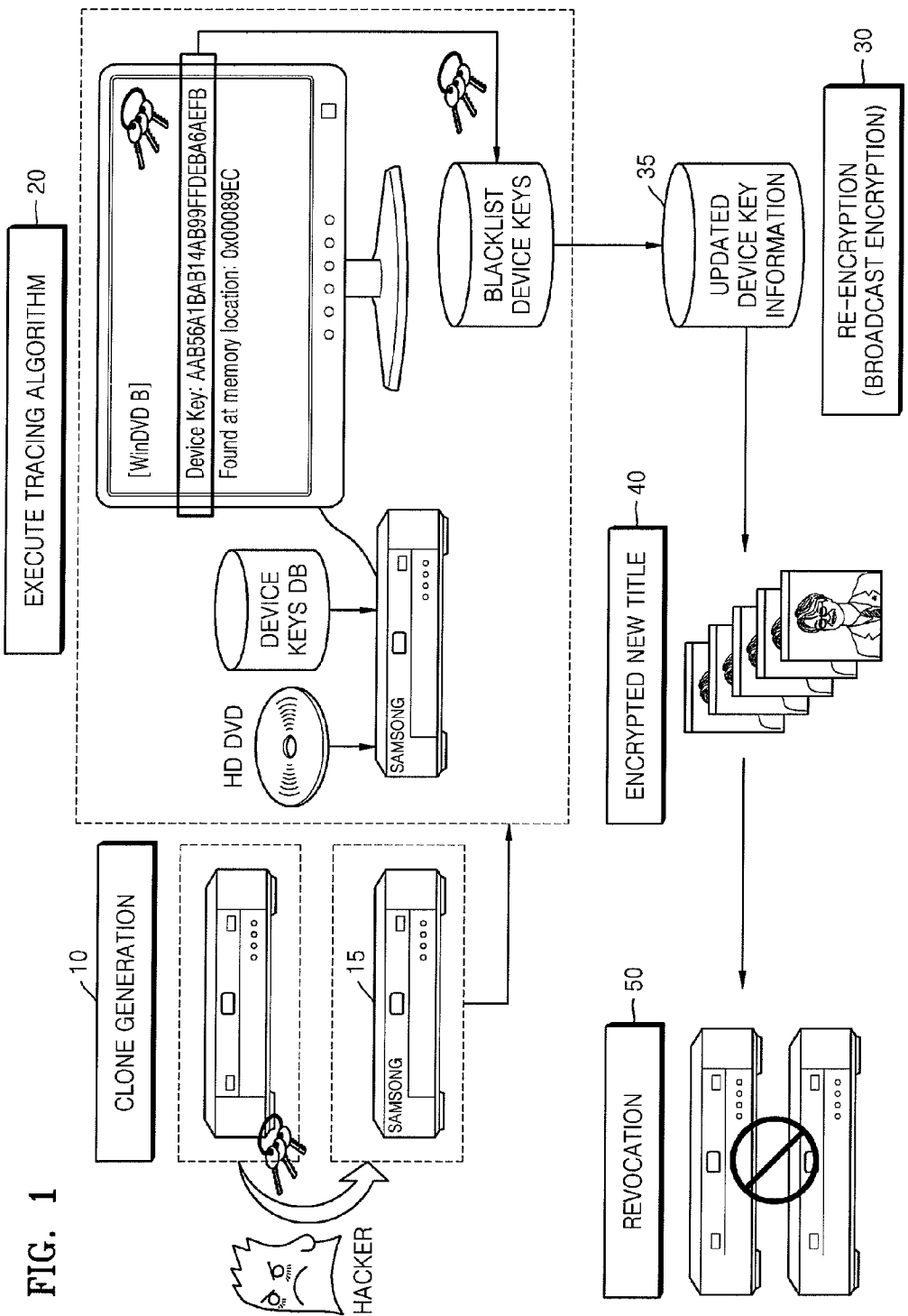
FIG. 1 is a conceptual diagram of broadcast encryption.

FIG. 1 is a conceptual diagram of broadcast encryption.

Hackers hack device keys of legal devices and generate a clone device 15 (clone generation 10). This case denotes that a device key is compromised, and the clone device 15 is called as an illegal decoder, i.e., an unauthorized decoder.

A broadcast center executes a tracing algorithm, finds compromised device keys, and then revokes the compromised device keys (execute tracing algorithm 20). Then, the found compromised device keys are included in a blacklist device keys list.

Then, information about the compromised device keys included in the blacklist device keys list is renewed so as to not be used in decoding and is re-encoded (re-encryption 30).

Device keys having renewed information are used to re-encode contents (encrypting new title 40).

Through the above process, the compromised device keys are revoked (revocation 50).

Figure 2:
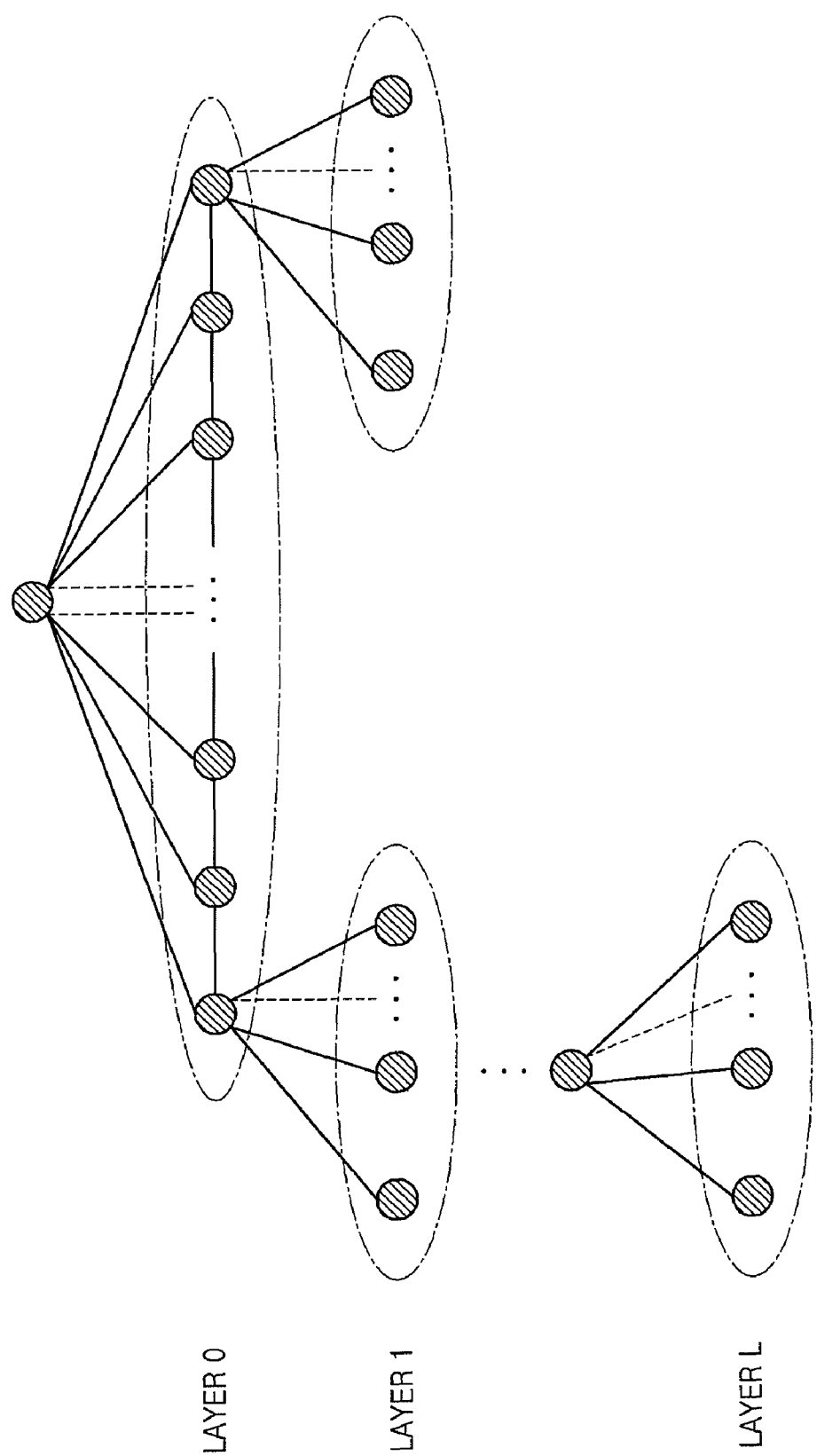
FIG. 2 is a diagram of a tree structure used in a hierarchical hash chain broadcast encryption scheme (HBES) algorithm.

FIG. 2 is a diagram of a tree structure used in a hierarchical hash chain broadcast encryption scheme (HBES) algorithm. The HBES forms all the users into a t-tree structure. Referring to FIG. 2, when a depth of the tree is L, all leaf nodes have L ancestor nodes.

Figures 3, 4:
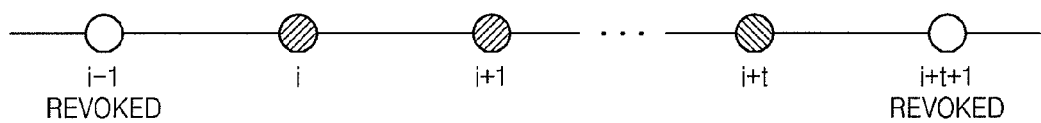
FIGS. 3 through 5 illustrate a method of allocating device keys in the HBES.
Figure 5:
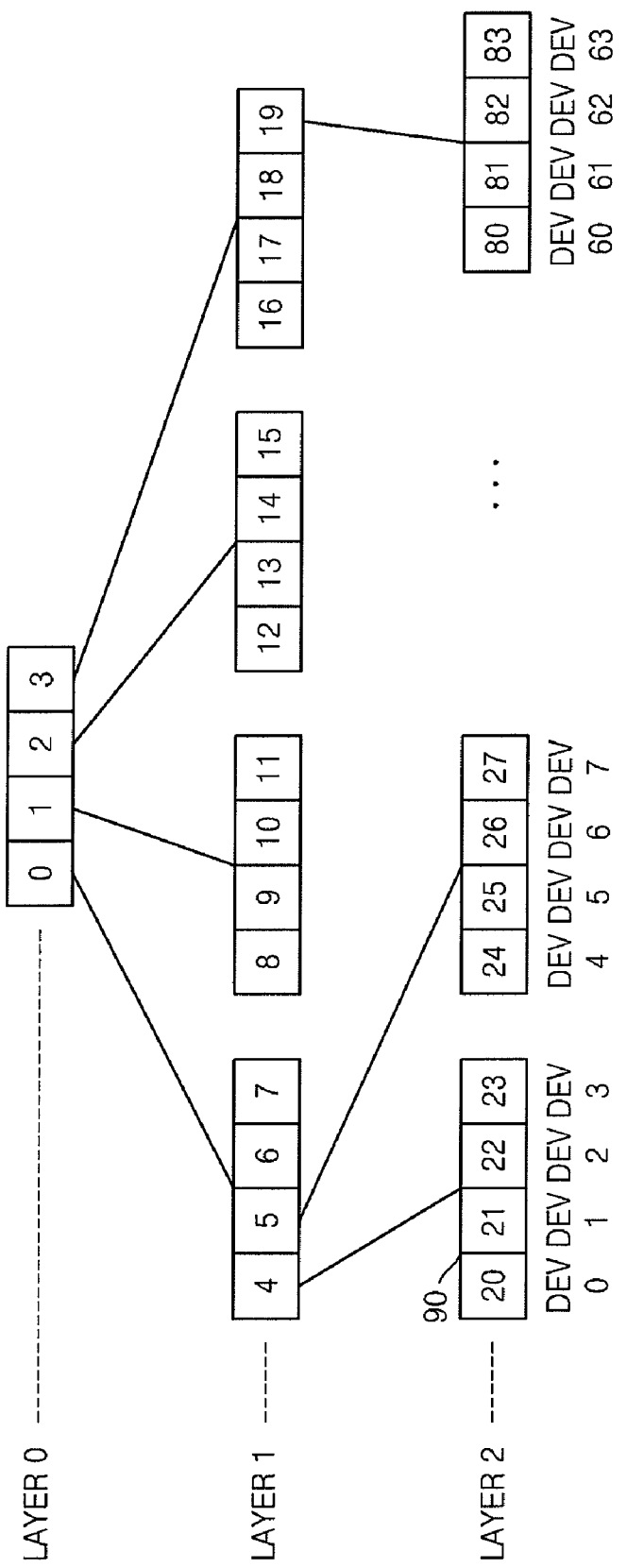

FIGS. 3 through 5 illustrate a method of allocating device keys in the HBES.

Firstly, In FIG. 3, the $i-1^{th}$ leaf and the $i+t+1^{th}$ leaf are revoked.

In the HBES, session keys (SKs) are simultaneously delivered to users included in one interval. When secret key encryption is performed, where K denotes a key is E(k, m), each header for users $u_i, \ldots,$ and $u_{i+t}$ is shown as in Equation 1.

$$E(h^{(o)}(K_i), SK) \quad \text{[Equation 1]}$$

In the HBES, a hash chain is used in allocating the device keys corresponding to the leaf nodes and t secret keys are stored in each layer.

FIGS. 4 and 5 illustrate a method of allocating the device keys in a 4-ary tree.

1. Firstly, a random seed value $S_i$ for each device is generated as denoted by reference numeral 60. FIG. 4 illustrates the generation of $S_1, S_2, S_3,$ and $S_4$.

2. A hash function is sequentially applied to $S_i$, and K(a,b) is calculated using Equation 2 and denoted by reference numeral 70.

$$K(a,b) = \text{hash}^{(b-1)}(S_a) \quad \text{[Equation 2]}$$

In Equation 2, $\text{hash}^2(S_a)$ denotes that a hash function is applied twice to $S_a$ and $\text{hash}^3(S_a)$ denotes that a hash function is applied three times to $S_a$.

3. The key values of the columns become key encryption key (KEK) values of each device, and are stored in each device.

In FIG. 4, the KEK value of the device 4 is {K(1,4), K(2,3), K(3,2), $S_4$}, as denoted by reference numeral 80.

In FIG. 5, the device 0, denoted by reference numeral 90, is the device with the node number 20. The device keys of the device 0, denoted by reference numeral 90, are shown in Equation 3.

$$\{S_0, h^3(S_1), h^2(S_2), h(S_3)\} \quad \text{[Equation 3]}$$
$$\{S_4, h^3(S_5), h^2(S_6), h(S_7)\}$$
$$\{S_{20}, h^3(S_{21}), h^2(S_{22}), h(S_{23})\}$$

Figure 6:
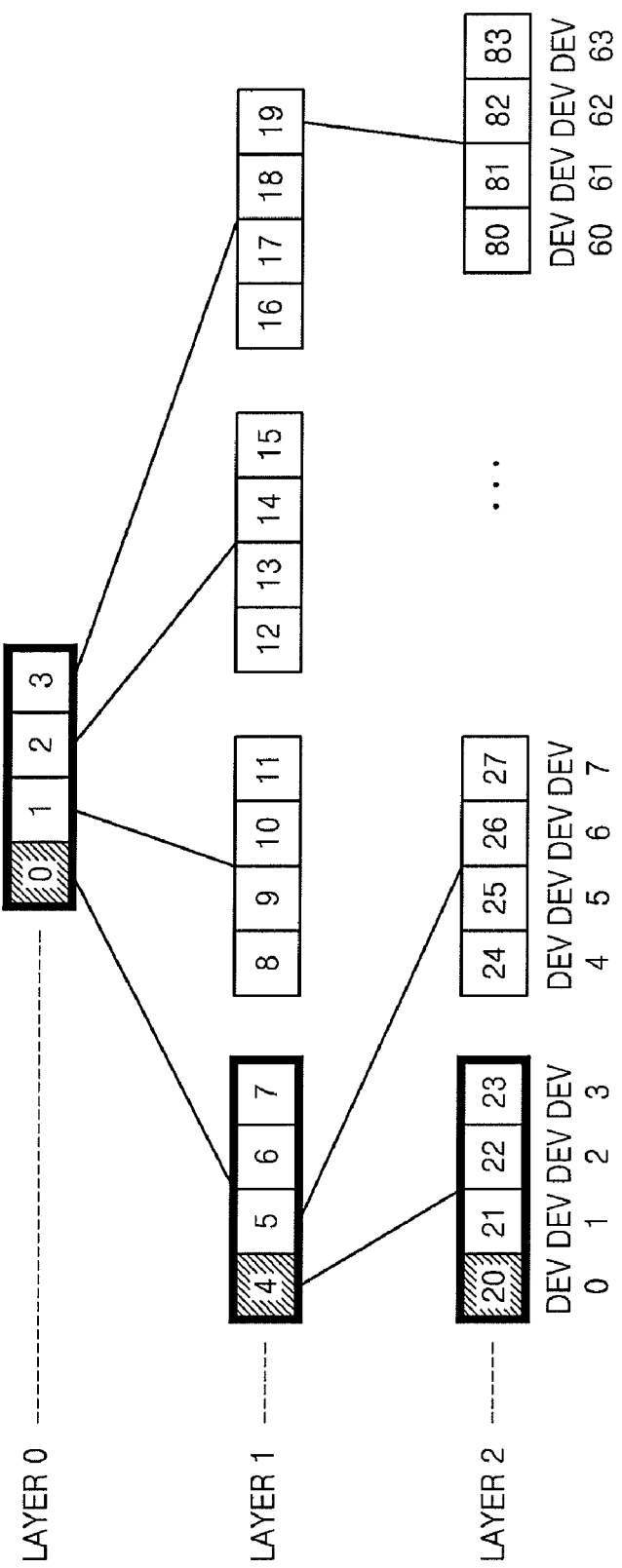
FIG. 6 illustrates a method of revoking device keys in the HBES.

FIG. 6 illustrates a method of revoking the device keys in the HBES.

In order to revoke the device keys in the HBES, a generation of a broadcast cipher text using a hash chain structure is required, wherein the hash chain structure is a structure for generating the device keys.

In FIG. 6, a process of revoking the device keys in a 4-ary tree is illustrated.

Broadcast key blocks (BKB), when the revoked device keys do not exist, are as in Equation 4 and encrypted contents are as in Equation 5.

$$\{E(h^3(S_0), SK)\} \quad \text{[Equation 4]}$$

$$E(SK, \text{Content}) \quad \text{[Equation 5]}$$

When the device 0 (node 20) is to be revoked, the cipher text is shown in Equation 6.

$$\{\text{Index}(0,4,20), E(h^2(S_1), SK), E(h^2(S_5), SK), E(h^2(S_{21}), SK)\} \quad \text{[Equation 6]}$$

The device key of the device 0 is as in Equation 3. Although any value included in Equation 3 is used, one of $h^2(S_1)$, $h^2(S_5)$, and $h^2(S_{21})$ for deciphering the cipher text given as in Equation 6 cannot be obtained. Thus, the device 0 cannot decipher the cipher text given by Equation 6.

Meanwhile, each of the devices with nodes 21-23 have one key value from among $S_{21}, h(S_{21}),$ and $h^2(S_{21})$. Accordingly, $h^2(S_{21})$ can be obtained and the obtained $h^2(S_{21})$ is used to decipher the cipher text given by Equation 6, thereby obtaining SK.

Therefore, only the device 0 with the node 20 can be excluded from the whole system and this is called as revocation of the device 0.

An example of the HBES algorithm may include a Marlin HBES algorithm.

In the Marlin HBES algorithm, a HBES (16, 16) system is used and denotes that 16 chains and 16 layers are used.

A size of a device key group is 4 K and a size of the whole system is given by Equation 7.

$$16 \text{ Layers} * 16 \text{ Node Keys} * 16 \text{ byte/key} \quad \text{[Equation 7]}$$

Elements of the BKB in the Marlin HBES algorithm are as follows.
1. Length of BKB
2. Key Check Data
This denotes a hash value of BK (=Session Key).
3. Number of revoked leaf nodes
4. Node IDs revoked at layer 0 ∥ . . . ∥ Node IDs revoked at layer 16 (represented as Tag)
5. Signature
6. Encrypted Broadcast Keys FIGS. 7 and 8 illustrate the Marlin HBES algorithm.

For convenience of explanation, the HBES algorithm, which uses four chains (t=4) and four layers (L=4), is considered. Referring to FIG. 7, four groups, sixteen groups, and sixty-four groups respectively exist at layer 0, layer 1, and layer 2.

Figure 7:
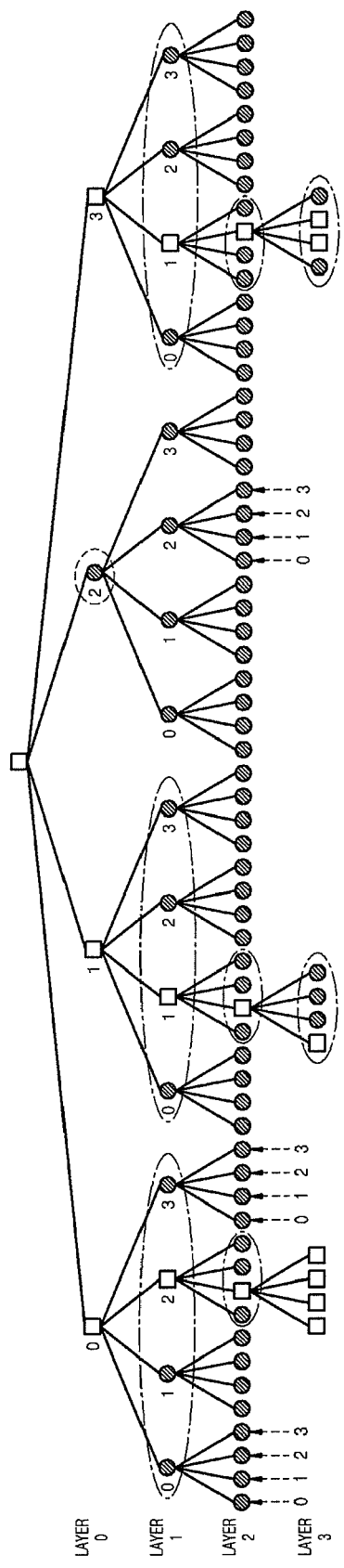

In FIG. 7, illegal devices are represented with a square. Referring to FIG. 7, seven devices are revoked. However, when all devices included in the sub-trees of HBES trees are illegal devices, the devices are represented with one ID. For example, in FIG. 7, all devices included in 10$^{th}$ group at layer 2 are illegal. In this case, the devices are represented with one ID. Accordingly, in order to represent the trees of FIG. 7, four illegal device IDs are required.

Figure 8:
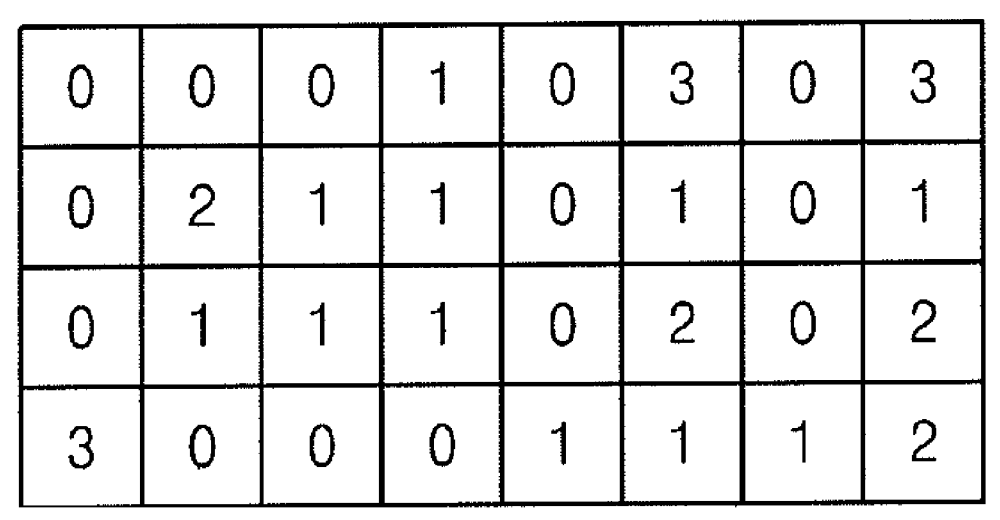

The revoked node IDs in FIG. 7 are illustrated as tags representing IDs of illegal devices, as in FIG. 8.

The device IDs are represented by writing node IDs of the groups, in which the devices are included, from the upper layer to the lower layer.

Device IDs of the revoked devices are as follows.
devices included in the 10$^{th}$ group at layer 2: <0 2 1 0>
first device included in the 22$^{nd}$ group at layer 2: <1 1 1 0>
second device included in 55$^{th}$ group at layer 2: <3 1 2 1>
third device included in 55$^{th}$ group at layer 2: <3 1 2 2>

Then, overhead bits will now described. That is, the overhead bits are added the head of each node ID and are formed of 2 bits (when using 16 chains, the overhead bits are formed of 4 bits).

The overhead bits have one of the binary numbers 00, 01, or 11 (0, 1, or 3 in decimal numbers).

When all devices included in one sub-tree are illegal, the devices are represented with one ID. Here, the overhead bits have the value of t−1. In FIG. 7, t is 4 and thus the overhead bits have the value of 3 (4−1=3). Accordingly, the device ID <0 2 1 0> has the overhead bit of 3 (<0 0 0 3>).

The overhead bits allocated to the node ID to be first written at each layer have the value of 0.

In addition, when the preceding node ID and the current node ID are included in the same group, the values that are the same as the preceding overhead bits are allocated to the overhead bits of current node ID; otherwise, the different values are allocated. In other words, when the preceding overhead bits are 00 and 01, 01 and 00 are respectively allocated to the overhead bits of the current node ID.

FIG. 8 illustrates a table showing the device IDs including tags by applying the above-described rule. In the table, the 2$^{nd}$, 4$^{th}$, 6$^{th}$, and 8$^{th}$ columns represent node IDs of each of the illegal devices.

The first column represents the overhead bit of the node <0 2 1 0>. In the node <0 2 1 0>, all devices included in the sub-trees are illegal, the overhead bits of <0 0 0 3> are represented.

The third column represents the overhead bits of the node <1 1 1 0>. First, the nodes at the layer 0 are all included in the same group, the overhead bits for the layer 0 become 0, which is the same with the preceding overhead bit (first column). The nodes at the layers 1, 2, and 3 are all included in different groups, and the overhead bits for the layers 1, 2, and 3 have values that are different to the preceding overhead bits and thus the overhead bits become <0 1 1 0>.

The fifth column represents the overhead bits of the node <3 1 2 1>. The nodes at the layer 0 are included in the same group with the node and thus the overhead bits for the layer 0 becomes 0, which is the same with the preceding overhead bits (the third column). The nodes at the layers 1, 2, and 3 are included in different groups and thus the overhead bits for the layers 1, 2, and 3 respectively have the values of 0, 0, and 1, which are different from the preceding overhead bits. Thus, the overhead bits become <0 0 0 1>.

The seventh column represents the overhead bits of the node <3 1 2 2>. The node <3 1 2 2> is included in the same group with the node <3 1 2 1>. Thus, the overhead bits have the values that are the same with those of the overhead bits (fifth column) and thus the overhead bits become <0 0 0 1>.

Figure 9:
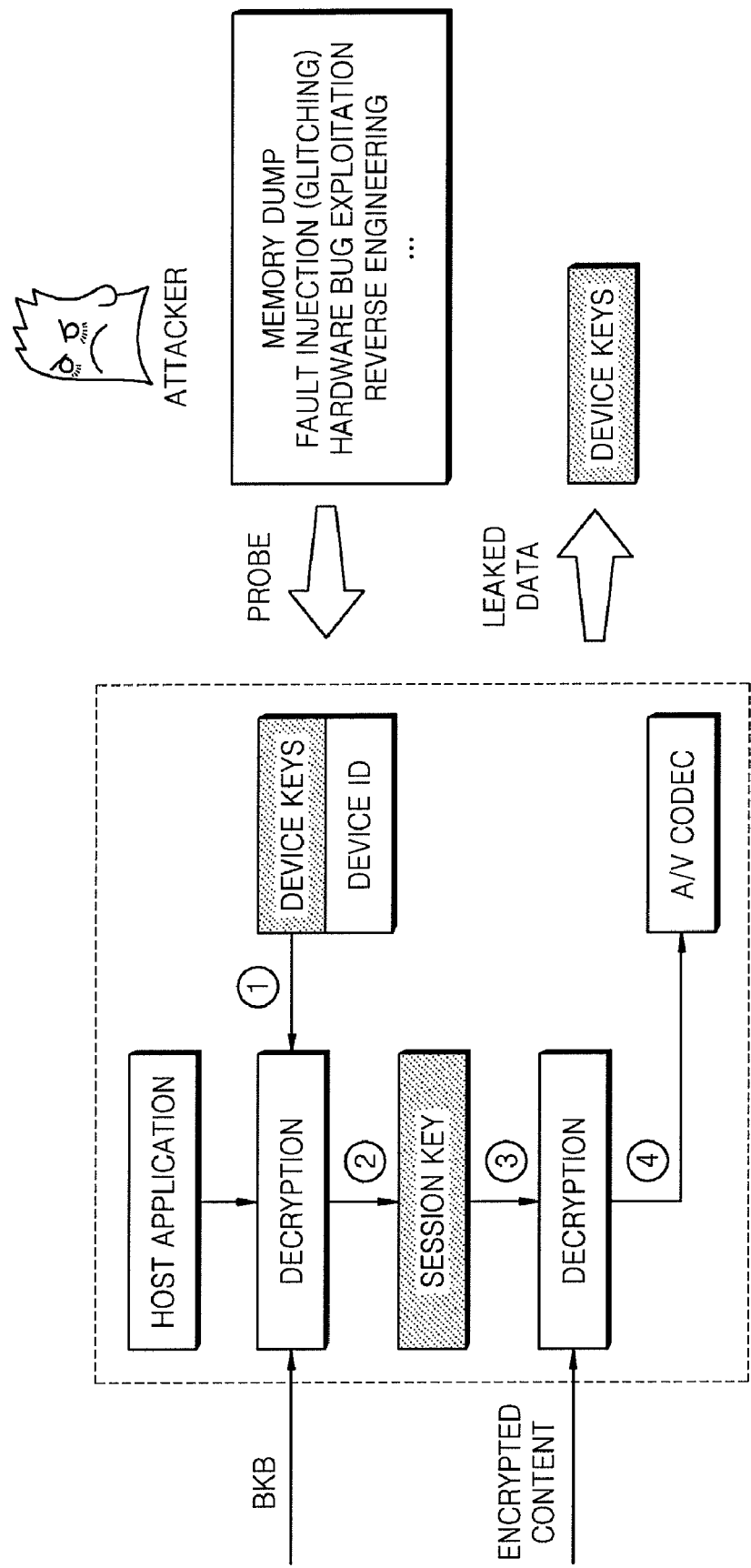
FIGS. 9 and 10 illustrate a potential exposure risk of device keys due to hacking.
Figure 10:
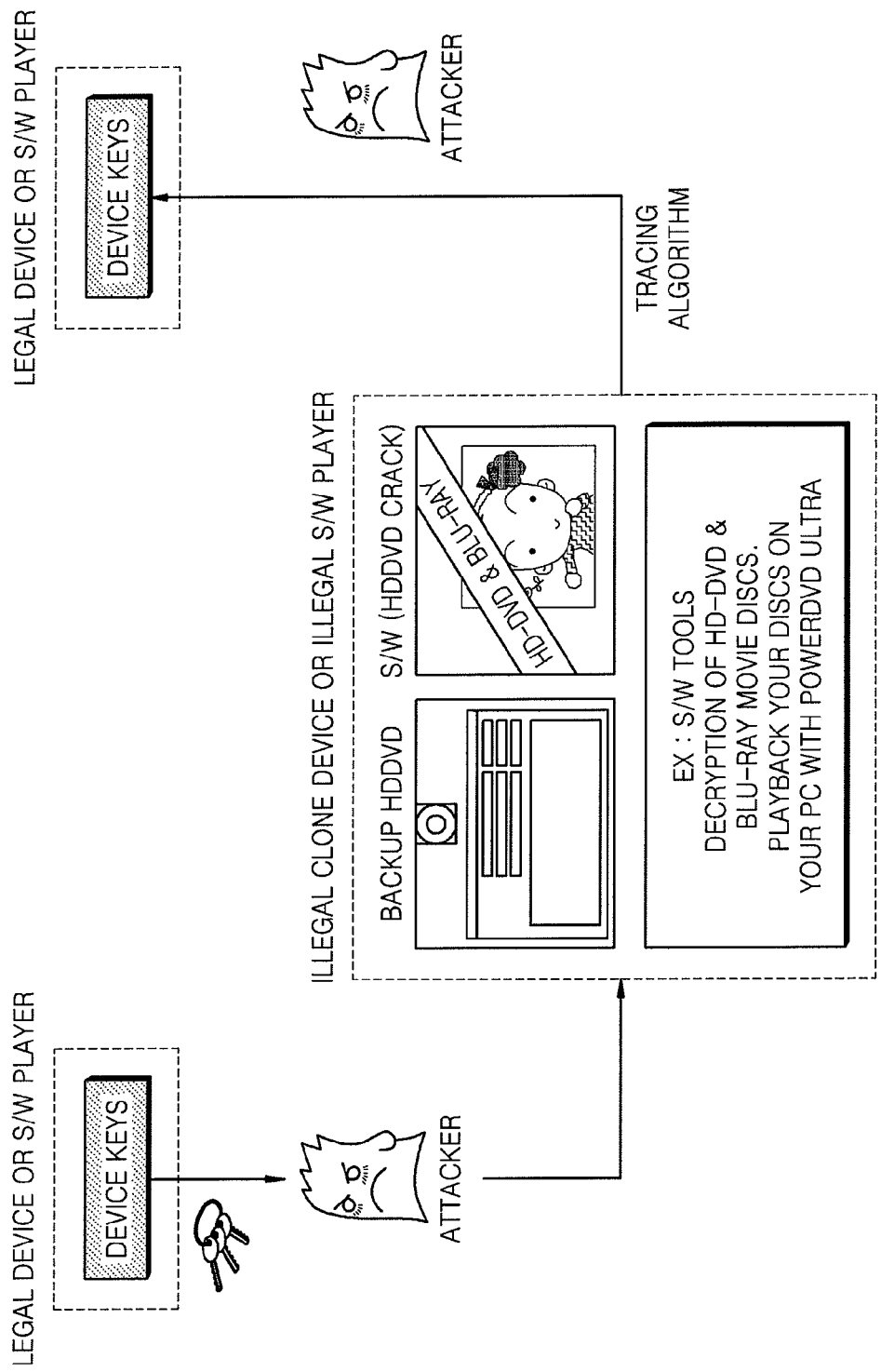

FIGS. 9 and 10 illustrate a potential exposure risk of the device keys due to hacking.

In a conventional key management system, a technology for tracing the exposure of device keys to hacking does not exist.

When the device keys are exposed, legal devices or legal software players may be attacked by the generation and distribution of illegal clone devices or illegal software.

Accordingly, as a solution to this, tracing the device keys exposed to the illegal devices or software (S/W) and revoking the exposed devices and the device keys used by the illegal S/W through the pre-secured HBES algorithm are required.

Figure 11:
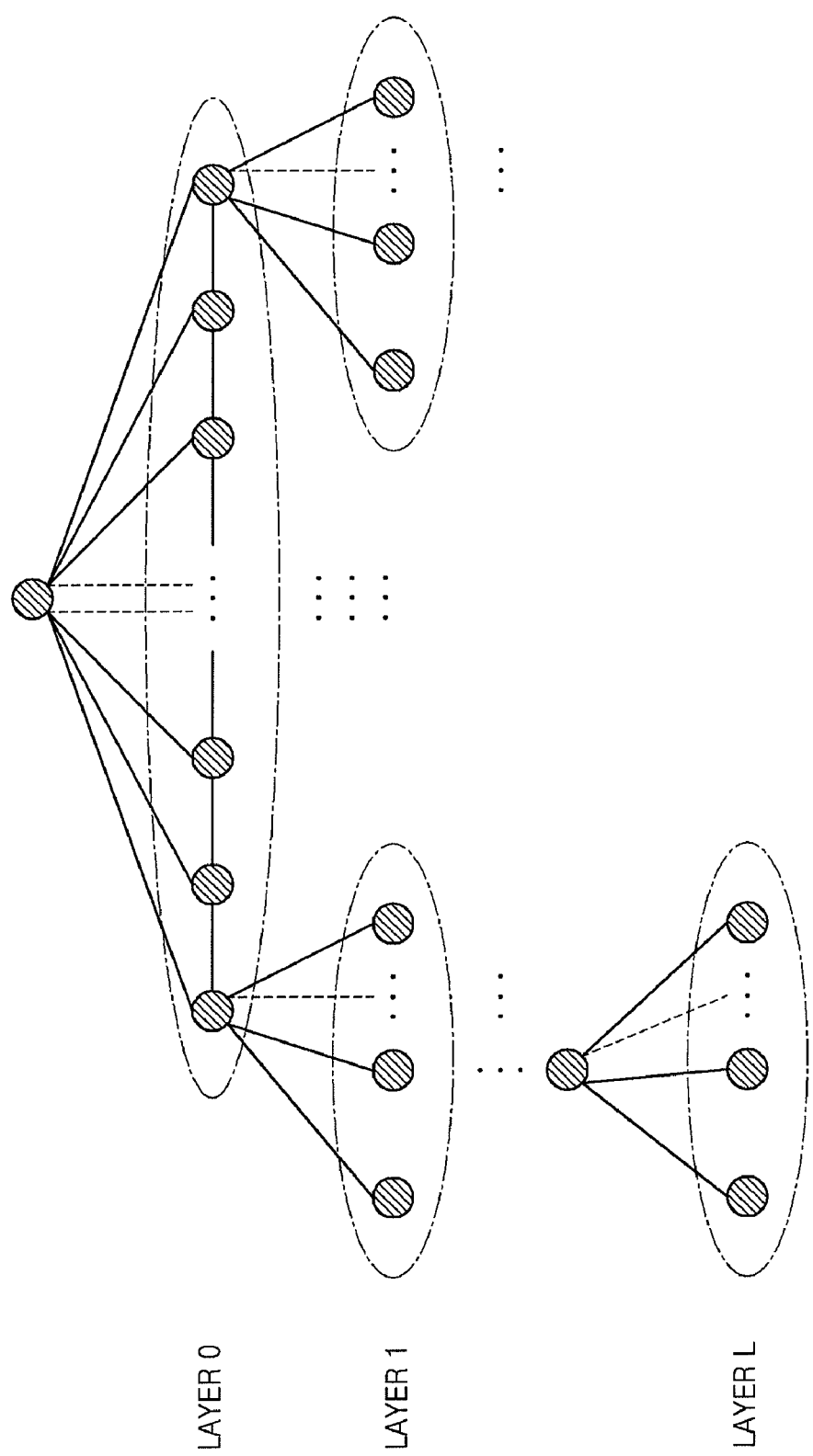
FIG. 11 illustrates a tree structure of HBES.
Figure 12:
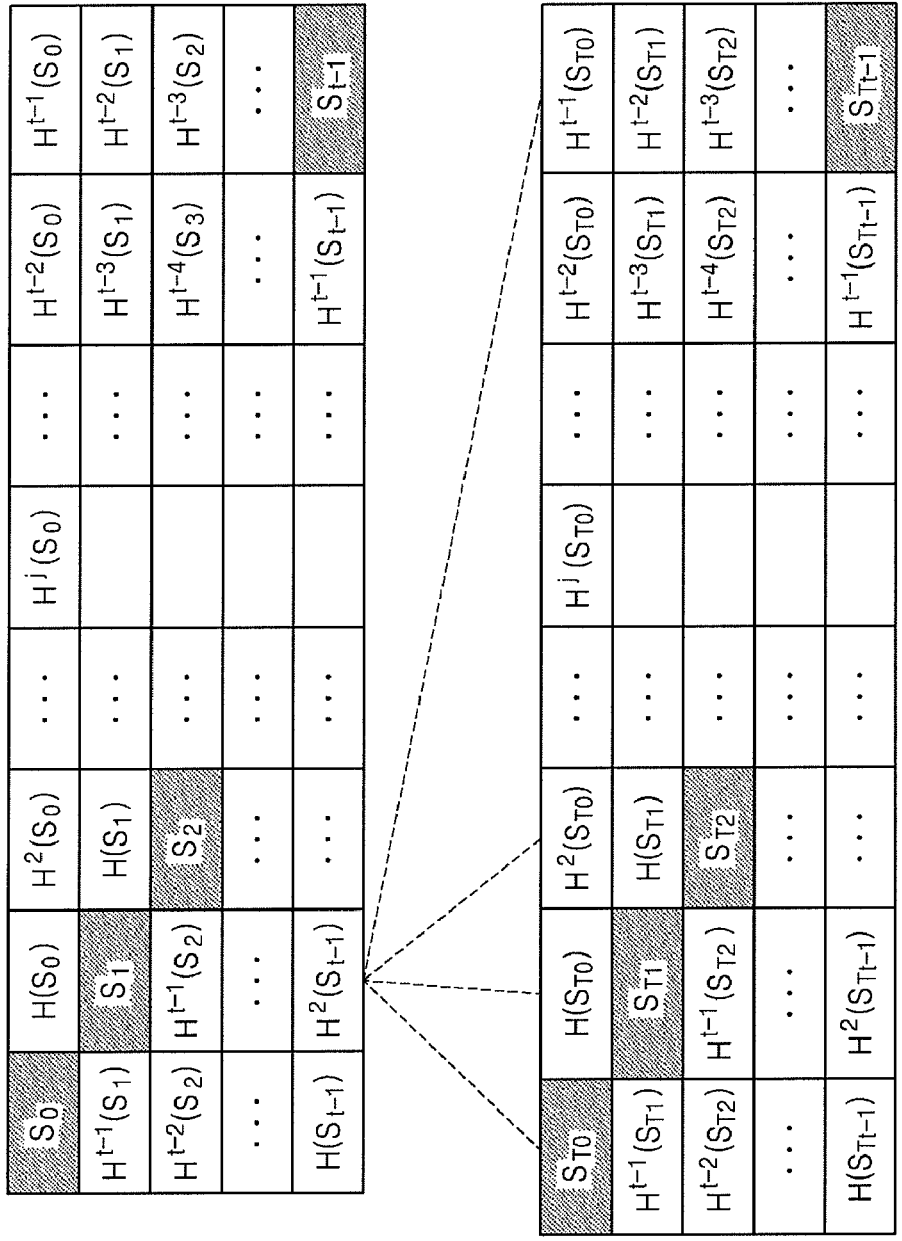
FIG. 12 illustrates device keys allocated in the tree structure of FIG. 11.

FIG. 11 illustrates a tree structure of the HBES. Referring to FIG. 11, t node chains are used in each layer L. FIG. 12 illustrates the device keys allocated in the tree structure of FIG. 11.

Figure 13:
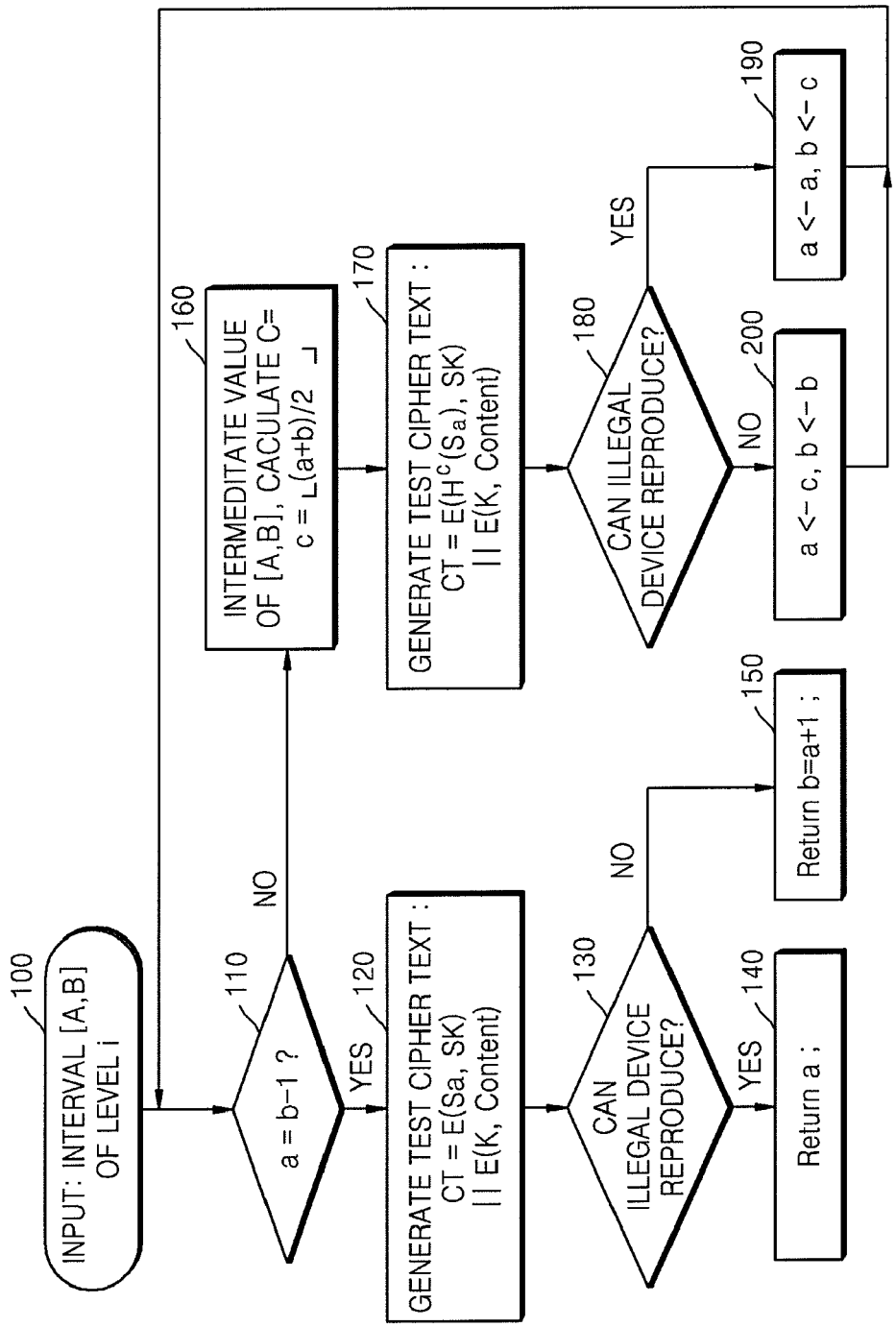
FIG. 13 is a flowchart illustrating a method of tracing device keys, according to an embodiment of the present invention.
Figure 14:
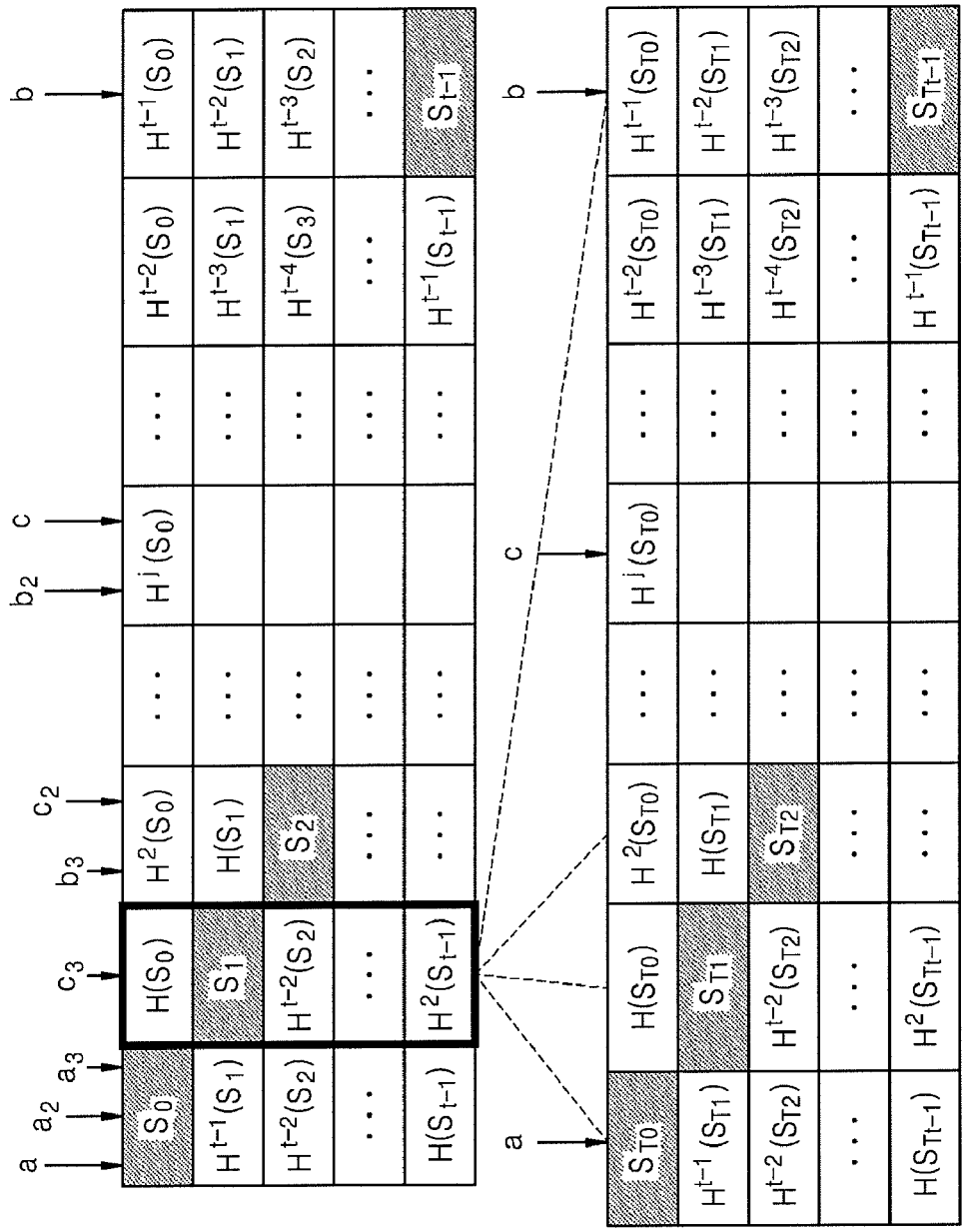
FIG. 14 illustrates tracing compromised device keys from among the device keys of FIG. 12.

FIG. 13 is a flowchart illustrating a method of tracing the device keys, according to an embodiment of the present invention. FIG. 14 illustrates tracing compromised device keys from among the device keys of FIG. 12. In the current embodiment, a binary search based test is performed so as to trace at least one device key used by a pirate box, that is, the illegal device.

First, the whole interval is set as the interval [a,b] of the device number, wherein the first device number is a and the last device number is b, in operation 100.

In operation 110, whether devices corresponding to a and b have consecutive node numbers, that is, a is b−1, is determined.

If a is b−1 in operation 110, $T_{CT}$ is calculated based on Equation 8, in operation 120.

$$T_{CT}=E((S_a),SK)$$ [Equation 8]

If $T_{CT}$ is 1 in operation 130, that is, when an illegal decoder can reproduce a test cipher text, the device having the device number a is the illegal device and thus, the device number a is output as the result of tracing, in operation 140. Otherwise if $T_{CT}$ is 0 in operation 130, that is, when an illegal decoder cannot reproduce a test cipher text, the device having the device number b is the illegal device and thus, the device number b is output as the result of tracing, in operation 150.

On the other hand, if a is not b−1 in operation 110, c, which is an intermediate value of a and b, is calculated in operation 160. Here, when c is not an integer number, c is calculated based on Equation 9 in order to obtain an integer number.

$$C=\lfloor(a+b)/2\rfloor$$ [Equation 9]

Equation 9 denotes that the largest value from among the integer numbers that are smaller than or the same with (a+b)/2 is determined as the intermediate value c.

Then, the text cipher text $T_{CT}$ is calculated based on Equation 10, in operation 170.

$$T_{CT}=E(H^c(S_a),SK)$$ [Equation 10]

If $T_{CT}$ is 1 in operation 180, $H^c(S_a)$ can be calculated from the device keys of the illegal device so that the illegal device exists in the devices using the device numbers a-c. Thus, the interval is set as [a,c] and tracing is performed again, in operation 190.

Otherwise if $T_{CT}$ is not 1 in operation 180, $H^c(S_a)$ cannot be calculated from the device keys of the illegal device so that the illegal device exists in the devices using the device numbers c-b, and thus, the interval is set as [c,b] and tracing is performed again, in operation 200.

In FIG. 14, $T_{CT}$, calculated with respect to the interval [a,b], is 1. Thus, the interval [a,c] is input as a new interval [$a_2$, $b_2$].

The new device numbers $a_2$ and $b_2$ are substituted into Equation 10 and an intermediate value of the device numbers $a_2$ and $b_2$, that is, $c_2$, is obtained. $a_2$ and $c_2$ are substituted into Equation 9 and $T_{CT}$ is calculated. In FIG. 14, when $T_{CT}$ is 1, [$a_2$, $c_2$] is input as a new interval [$a_3$, $b_3$].

As described above, the interval gradually narrows and whether the illegal decoder can reproduce the test cipher text is determined, thereby tracing the device keys used by the illegal decoder.

Figure 15:
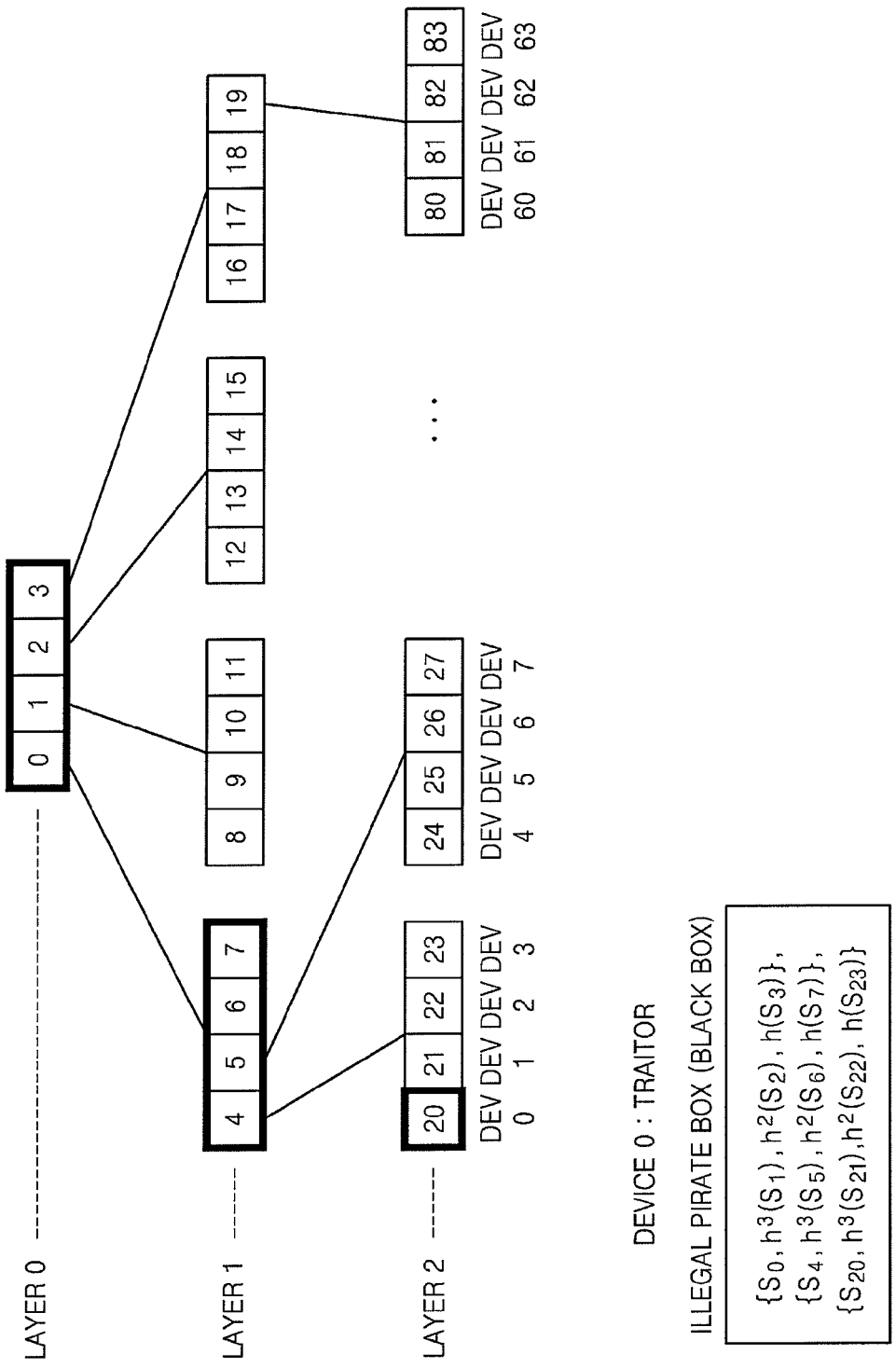
FIG. 15 illustrates tracing device keys, according to an embodiment of the present invention.

FIG. 15 illustrates tracing the device keys, according to an embodiment of the present invention. Referring to FIG. 15, the device 0 (node 20) is an illegal device.

Firstly, a=0 and b=3 are input at the layer 0. Since, a is not b−1, c is calculated. In this case, c is 1.

The device 0 has the device key $S_0$ and thus, $E(h(S_0)),SK)$ can be calculated. Thus, $T_{CT}$ is 1 and the interval [a,c]=[0,1] is input as a new interval.

In the new interval, a is b−1, whether $E(S_0, SK)$ can be calculated is determined. Since $T_{CT}$=1, a=0 is output as the illegal node number.

Then, tracing for the sub-tree of the node 0 is performed. In the sub-tree, the device numbers 0-3 are respectively given to the nodes 4-7. Thus, a=0 and b=3 are input at the layer 1. Since a is not b−1, c is calculated. In this case, c is 1.

The device 0 (node 20) has the device key $S_4$ and thus, $E(h(S_4)),SK)$ can be calculated. Thus, $T_{CT}$ is 1 and the interval [a,c]=[0,1] is input as a new interval.

In the new interval, a is b−1, whether $E(S_4, SK)$ can be calculated is determined. Since $T_{CT}$=1, the node number 4 is output as the illegal node number.

Then, tracing for the sub-tree of the node 4 is performed. In the sub-tree, the device numbers 0-3 are respectively given to the nodes 20-23. Thus, a=0 and b=3 are input at the layer 2. Since a is not b−1, c is calculated. In this case, c is 1.

The device 0 (node 20) has the device key $S_{20}$ and thus, $E(h(S_{20})),SK)$ can be calculated. Thus, $T_{CT}$ is 1 and the interval [a,c]=[0,1] is input as a new interval In the new interval, a is b−1, whether $E(S_{20}, SK)$ can be calculated is determined. Since $T_{CT}$=1, the node number 20 is output as the illegal node number.

Therefore, the devices having the node numbers 0, 4, and 20 are illegal and their corresponding device keys are revoked so that the illegal device can be prevented from unlawfully accessing the encrypted contents.

The method of tracing the device keys according to the current embodiment has a running time defined by Equation 11.

$$L*\log_2 t*T \quad \text{[Equation 11]}$$

Here, L denotes a depth of a tree, t is a number of nodes, and T is the time taken to test one time.

For example, in the Marlin HBES system, when L=16, t=16, and T=60, the time taken to find out at least one device key set is only about 1 hour.

The technology according to the present invention can be applied to prevent exposure of the device keys to hacking. The present invention provides a method of tracing which can be applied to an HBES algorithm structure.

Figure 16:
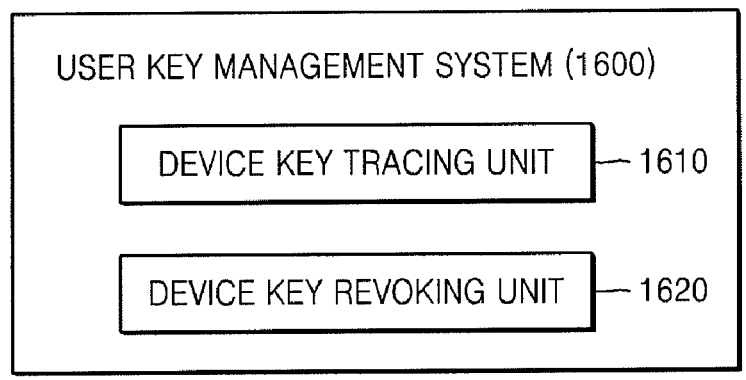
FIG. 16 is a block diagram of a user key management system, according to an embodiment of the present invention.

FIG. 16 is a block diagram of a user key management system 1600, according to an embodiment of the present invention.

Referring to FIG. 16, the user key management system 1600, which is for broadcast encryption, includes a device key tracing unit 1610 and a device key revoking unit 1620. The device key tracing unit 1610 performs tracing a device key of an illegal decoder using a binary search. The device key revoking unit 1620 performs revoking the traced device key.

The user key management system 1600 uses a device key allocation structure using a hash chain. Also, a hierarchical hash chain broadcast encryption scheme (HBES) algorithm is used in the user key management system 1600.

Figure 17:
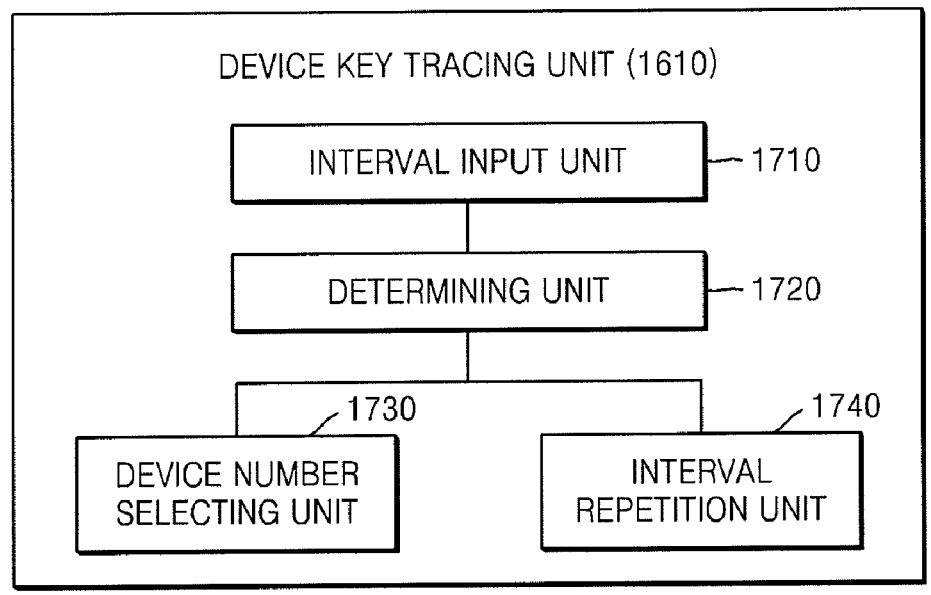
FIG. 17 is a block diagram of a device key tracing unit included in the user key management system of FIG. 16, according to an embodiment of the present invention.

FIG. 17 is a block diagram of the device key tracing unit 1610 included in the user key management system 1600, according to an embodiment of the present invention.

Referring to FIG. 17, the device key tracing unit 1610 includes an interval input unit 1710, a determining unit 1720, a device number selecting unit 1730, and an interval repetition unit 1740. The interval input unit 1710 inputs an interval [a,b] of device numbers, wherein the first device number is a and the last device number is b. The determining unit 1720 determines whether devices corresponding to a and b have consecutive node numbers, that is, a is b−1.

If a is b−1, the device number selecting unit 1730 generates a test cipher text using a so as to determine whether an illegal decoder can reproduce the test cipher text and as a result selects one of a and b. The test cipher text, $T_{CT}$ is calculated based on Equation 10 as described above. If $T_{CT}$ is 1, that is, when the illegal decoder can reproduce a test cipher text, the device having the device number, a is the illegal device and thus, the device number selecting unit 1730 selects a as the result of tracing. Otherwise if $T_{CT}$ is 0, that is, when an illegal decoder cannot reproduce a test cipher text, the device having the device number, b is the illegal device and thus, the device number selecting unit 1730 selects b as the result of tracing.

If a is not b−1, the interval repetition unit 1740 calculates c, which is an intermediate value of a and b, generates a test cipher text using c so as to determine whether the illegal decoder can reproduce the test cipher text, and as a result, selects one of the interval [a,c] and the interval [c,b], outputs the selected interval to the interval input unit 1710 to trace the device key again.

The interval repetition unit 1740 determines c based on Equation 9 as described above. Equation 9 denotes that the largest value from among the integer numbers that are smaller than or the same as (a+b)/2 is determined as the intermediate value c.

The text cipher text $T_{CT}$ is calculated based on Equation 10 as described above. If $T_{CT}$ is 1, an illegal device exists in the devices from the device number a to c. Thus, the interval repetition unit 1740 selects the next interval as [a,c] and outputs the selected interval to the interval input unit 1710 to trace the device key again.

Otherwise if $T_{CT}$ is not 1, an illegal device exists in the devices from the device number c to b. Thus, the interval repetition unit 1740 selects the next interval as [c,b] and outputs the selected interval to the interval input unit 1710 to trace the device key again.

As described above, the interval gradually narrows and whether the illegal decoder can reproduce the test cipher text is determined, thereby tracing the device keys used by the illegal decoder.

The invention can also be embodied as computer readable codes on a computer readable recording medium. The computer readable recording medium is any data storage device that can store data, which can be thereafter read by a computer system. Examples of the computer readable recording medium (including all devices having information process functions) include read-only memory (ROM), random-access memory (RAM), CD-ROMs, magnetic tapes, floppy disks, and optical data storage devices.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of tracing a device key of an unauthorized decoder in a user key management system for broadcast encryption, the method comprising:
    tracing by a computer a device key using a binary search; and
    revoking the traced device key,
    wherein the tracing the device key using the binary search comprises:
        inputting an interval [a,b] of device numbers, wherein a first device number is a and a last device number is b; and
        determining whether a is b−1;
        if a is b−1, generating a first test cipher text using a to determine whether the unauthorized decoder can reproduce the first test cipher text and as a result, selecting one of a and b as the unauthorized decoder.

2. The method of claim 1, wherein the tracing the device key using the binary search further comprises:
    if a is not b−1, calculating c, which is an intermediate value of a and b, generating a second test cipher text using c to determine whether the unauthorized decoder can reproduce the second test cipher text, and as a result, selecting one of the interval [a,c] and the interval [c,b], inputting the selected interval, and tracing the device key again.

3. The method of claim 2, wherein c is a largest value from among integer numbers that are smaller than or equal to (a+b)/2, if (a+b)/2 is not an integer number.

4. The method of claim 1, wherein the user key management system uses a device key allocation structure using a hash chain.

5. The method of claim 4, wherein in the user key management system, a hierarchical hash chain broadcast encryption scheme (HBES) algorithm is used.

6. A user key management system for broadcast encryption, the system comprising:
    a memory, which stores software operations; and
    a processor, which executes the stored software operations; the stored software operations comprise:
    tracing by a device key tracing unit a device key of an unauthorized decoder using a binary search; and
    revoking by a device key revoking unit the traced device key,
    wherein the tracing by the device key tracing unit comprises:
        inputting by an interval input unit an interval [a,b] of device numbers, wherein a first device number is a and a last device number is b; and
        determining by a determining unit whether a is b−1;
        if a is b−1, generating by a device number selecting unit, a first test cipher text using a to determine whether the unauthorized decoder can reproduce the first test cipher text and as a result, selects one of a and b as the unauthorized decoder.

7. The system of claim 6, wherein the tracing by the device key tracing unit further comprises:
    if a is not b−1, calculating c, by an interval repetition unit, which is an intermediate value of a and b, generating, by the interval repetition unit a second test cipher text using c to determine whether the unauthorized decoder can reproduce the second test cipher text, and as a result, selects one of the interval [a,c] and the interval [c,b], outputs the selected interval to the interval input unit, inputs the interval selected by the interval input unit, into the determining unit and the device number selecting unit, and traces the device key again.

8. The system of claim 7, wherein the determining c by the interval repetition unit further comprises determining c as a largest value from among integer numbers that are smaller than or equal to (a+b)/2, if (a+b)/2 is not an integer number.

9. The system of claim 6, wherein the processor executes the software operations using a device key allocation structure using a hash chain.

10. The system of claim 9, wherein in the system, a hierarchical hash chain broadcast encryption scheme (HBES) algorithm is used.

11. A non-transitory computer readable recording medium having embodied thereon a computer program for executing a method of tracing a device key of an unauthorized decoder in a user key management system for broadcast encryption, the method comprising:
    tracing a device key using a binary search; and
    revoking the traced device key,
    wherein tracing a device key using a binary search comprises:
        inputting an interval [a,b] of device numbers, wherein a first device number is a and a last device number is b;
        determining whether a is b−1;
        if a is b−1, generating a first test cipher text using a to determine whether the unauthorized decoder can reproduce the first test cipher text and as a result, selecting one of a and b as the unauthorized decoder.

12. The non-transitory computer readable recording medium of claim 11, wherein the tracing the device key using the binary search further comprises:
    if a is not b−1, calculating c, which is an intermediate value of a and b, generating a second test cipher text using c to determine whether the unauthorized decoder can reproduce the second test cipher text, and as a result, selecting one of the interval [a,c] and the interval [c,b], inputting the selected interval, and tracing again the device key.

13. The non-transitory computer readable recording medium of claim 12, wherein c is a largest value from among integer numbers that are smaller than or equal to (a+b)/2, if (a+b)/2 is not an integer number.

14. The non-transitory computer readable recording medium of claim 11, wherein the user key management system uses a device key allocation structure using a hash chain.

15. The non-transitory computer readable recording medium of claim 14, wherein in the user key management system, a hierarchical hash chain broadcast encryption scheme (HBES) algorithm is used.

16. The method of claim 1, wherein the first test cipher text is calculated based on the following equation:

$$T_{CT}=E((S_a),SK)$$

where the Sa is the device key for the device a and the SK is a session key.

17. The method of claim 2, wherein the second test cipher text is calculated based on the following equation:

$$T_{CT}=E(H^c(S_a),SK)$$

where the Sa is the device key for the device a and the SK is a session key.

18. The system of claim 6, wherein the first test cipher text is calculated by the device number selecting unit based on the following equation:

$$T_{CT}=E((S_a),SK)$$

where the Sa is the device key for the device a and the SK is a session key.

19. The system of claim 7, wherein the second test cipher text is calculated by the device number selecting unit based on the following equation:

$$T_{CT}=E(H^c(S_a),SK)$$

where the Sa is the device key for the device a and the SK is a session key.

20. The non-transitory computer readable medium of claim 11, wherein the first test cipher text is calculated based on the following equation:

$$T_{CT}=E((S_a),SK)$$

where the Sa is the device key for the device a and the SK is a session key.

21. The non-transitory computer readable medium of claim 12, wherein the second test cipher text is calculated based on the following equation:

$$T_{CT}=E(H^c(S_a),SK)$$

where the Sa is the device key for the device a and the SK is a session key.

* * * * *